United States Patent [19]

Green et al.

[11] Patent Number: 4,646,231
[45] Date of Patent: Feb. 24, 1987

[54] METHOD OF SYNCHRONIZING THE SEQUENCE BY WHICH A VARIETY OF RANDOMLY CALLED UNRELATED ACTIVITIES ARE EXECUTED IN A DIGITAL PROCESSOR

[75] Inventors: Howard H. Green, San Diego; Christopher J. Tomlinson, Encinitas, both of Calif.

[73] Assignee: Burroughs Corporation, Detroit, Mich.

[21] Appl. No.: 515,856

[22] Filed: Jul. 21, 1983

[51] Int. Cl.$^4$ .............................................. G06F 15/16
[52] U.S. Cl. .................................... 364/200; 364/300
[58] Field of Search ... 364/200 MS File, 900 MS File

[56] References Cited

PUBLICATIONS

Lorin et al., "Operating Systems", Chapter 10, Processor Management, pp. 237–255, 1981.

*Primary Examiner*—James R. Hoffman
*Attorney, Agent, or Firm*—Charles J. Fassbender; Kevin R. Peterson

[57] ABSTRACT

A method of synchronizing the sequence by which a variety of unrelated activities are executed in a digital processor when the activities are randomly called by multiple callers includes the steps of: providing a single processor queue for holding respective pointers to each different kind of activity that the processor performs; entering the pointer of an activity in the processor queue the first time that the activity is called; providing respective activity queues for each different kind of activity that the processor performs; entering a pointer to the caller of an activity in the respective queue for the called activity each time the activity is called subsequent to its first call; repeatedly executing a single activity pointed to by one pointer in the processor queue until that activity is executed once for each of its callers, provided that if the single activity calls another activity then, executing the single activity only up to the point where the call occurs; and proceeding in the same fashion with the execution of another activity pointed to by the processor queue.

11 Claims, 9 Drawing Figures

| | | | | | | | | | | |
|---|---|---|---|---|---|---|---|---|---|---|
| | | | | | | | | | | |
| | | | | | | | | | | |
| | | | | | $AR_{14}P_6$ | | | | | |
| | | | | | $AR_{13}P_6$ | | | $AR_{13}P_9$ | | |
| | | | | | $AR_{12}P_6$ | | | $AR_{12}P_9$ | | |
| | $AR_{11}P_2$ | | | | $AR_{11}P_6$ | | | $AR_{11}P_9$ | | |
| | $AR_{10}P_2$ | | | | $AR_{10}P_6$ | | | $AR_{10}P_9$ | | |
| | $AR_9P_2$ | $AR_9P_3$ | | | $AR_9P_6$ | | | $AR_9P_9$ | | $AR_9P_{11}$ |
| | $AR_8P_2$ | $AR_8P_3$ | | | $AR_8P_6$ | $AR_8P_7$ | | $AR_8P_9$ | | $AR_8P_{11}$ |
| | $AR_7P_2$ | $AR_7P_3$ | | | $AR_7P_6$ | $AR_7P_7$ | | $AR_7P_9$ | $AR_7P_{10}$ | $AR_7P_{11}$ |
| | $AR_6P_2$ | $AR_6P_3$ | | $AR_6P_5$ | $AR_6P_6$ | $AR_6P_7$ | | $AR_6P_9$ | $AR_6P_{10}$ | $AR_6P_{11}$ |
| $AP_5P_1$ | $AR_5P_2$ | $AR_5P_3$ | | $AR_5P_5$ | $AR_5P_6$ | $AR_5P_7$ | | $AR_5P_9$ | $AR_5P_{10}$ | $AR_5P_{11}$ |
| $AR_4P_1$ | $AR_4P_2$ | $AR_4P_3$ | | $AR_4P_5$ | $AR_4P_6$ | $AR_4P_7$ | $AR_4P_8$ | $AR_4P_9$ | $AR_4P_{10}$ | $AR_4P_{11}$ |
| $AR_3P_1$ | $AR_3P_2$ | $AR_3P_3$ | $AR_3P_4$ | $AR_3P_5$ | $AR_3P_6$ | $AR_3P_7$ | $AR_3P_8$ | $AR_3P_9$ | $AR_3P_{10}$ | $AR_3P_{11}$ |
| $AR_2P_1$ | $AR_2P_2$ | $AR_2P_3$ | $AR_2P_4$ | $AR_2P_5$ | $AR_2P_6$ | $AR_2P_7$ | $AR_2P_8$ | $AR_2P_9$ | $AR_2P_{10}$ | $AR_2P_{11}$ |
| $AR_1P_1$ | $AR_1P_2$ | $AR_1P_3$ | $AR_1P_4$ | $AR_1P_5$ | $AR_1P_6$ | $AR_1P_7$ | $AR_1P_8$ | $AR_1P_9$ | $AR_1P_{10}$ | $AR_1P_{11}$ |
| $PR_1$ | $PR_2$ | $PR_3$ | $PR_4$ | $PR_5$ | $PR_6$ | $PR_7$ | $PR_8$ | $PR_9$ | $PR_{10}$ | $PR_{11}$ |

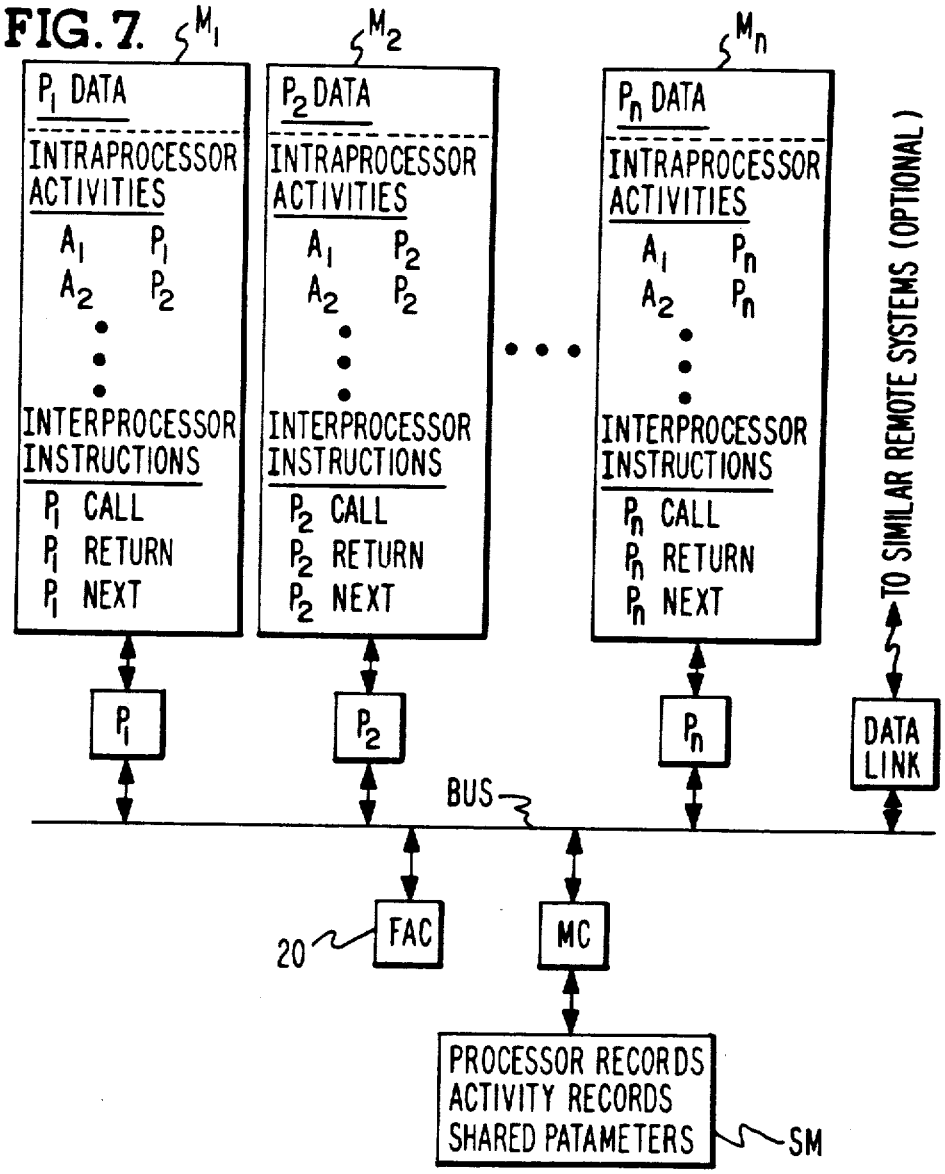

METHOD OF SYNCHRONIZING THE SEQUENCE BY WHICH A VARIETY OF RANDOMLY CALLED UNRELATED ACTIVITIES ARE EXECUTED IN A DIGITAL PROCESSOR

BACKGROUND OF THE INVENTION

This invention relates to digital computers, and more particularly, it relates to digital computer systems in which a plurality of independent processors interact to perform respective activities within various tasks.

Conventionally, a data processing task is performed in its entirety by a single computer. That task, for example, may be the solving of a scientific problem, the calculation of a payroll, etc. But in any case, the speed at which the task is performed by the single computer depends directly upon the number of data bits that the computer can process in a single cycle and the speed of that cycle.

Thus, the computing power of a single computer conventionally is increased by either increasing the number of bits which the computer can operate on in a single cycle or by shortening the computer's cycle time. However, the extent to which the time can be shortened is limited by the speed at which integrated circuits operate. And increasing the number of bits on which a computer can operate in a single cycle also causes the complexity of the computer's design and maintenance to increase.

Alternatively, the speed at which a data processing task is performed may be increased by providing a plurality of independent processors each of which performs one or more activities within the task. In such a multiprocessor system, the individual processors can be tailored to perform their respective activities which decreases the execution time of the overall task. Further, the individual processors of the system inherently make the system modular, which reduces the complexity of the system's design and maintenance.

Also, in the multiprocessor system, the various processors can perform activities for several unrelated tasks at the same time. This allows for more parallelism within the system, which further increases the system's computing power.

However, in the multiprocessor system, some means must be provided for coordinating the various activities that the processors perform. That is, a means must be provided for keeping the execution of activities within a task in the correct sequence. And a means must be provided for keeping many processors active at the same time. But this becomes very complicated as the number of processors, number of tasks, and number of activities within each task increases.

Accordingly, a primary object of the invention is to provide a method of synchronizing the sequence by which a variety of randomly called unrelated activities are executed in a digital processor.

BRIEF SUMMARY OF THE INVENTION

In the present invention, a method of synchronizing the sequence by which a variety of unrelated activities are executed in a digital processor when those activities are randomly called by multiple callers includes the steps of: providing a single processor queue for holding respective pointers to each different kind of activity that the processor performs; entering the pointer of an activity in the processor queue the first time that the activity is called; providing respective activity queues for each different kind of activity that the processor performs; entering a pointer to the caller of an activity in the respective queue for the called activity each time the activity is called subsequent to its first call; repeatedly executing a single activity pointed to by one pointer in the processor queue until that activity is executed once for each of its callers, provided that if the single activity calls another activity then, executed the single activity only up to the point where the call occurs; and proceeding in the same fashion with the execution of another activity pointed to by the processor queue.

BRIEF DESCRIPTION OF THE DRAWINGS

Various features and advantages of the invention are described in the Detailed Description in conjunction with the accompanying drawings wherein:

FIG. 2 illustrates an exemplary arrangement of the processor records and activity records in the shared memory of the FIG. 1 system;

FIG. 7 illustrates another system for synchronizing sequences of activities within digital processors according to the invention.

DETAILED DESCRIPTION OF THE INVENTION

Figure 1:
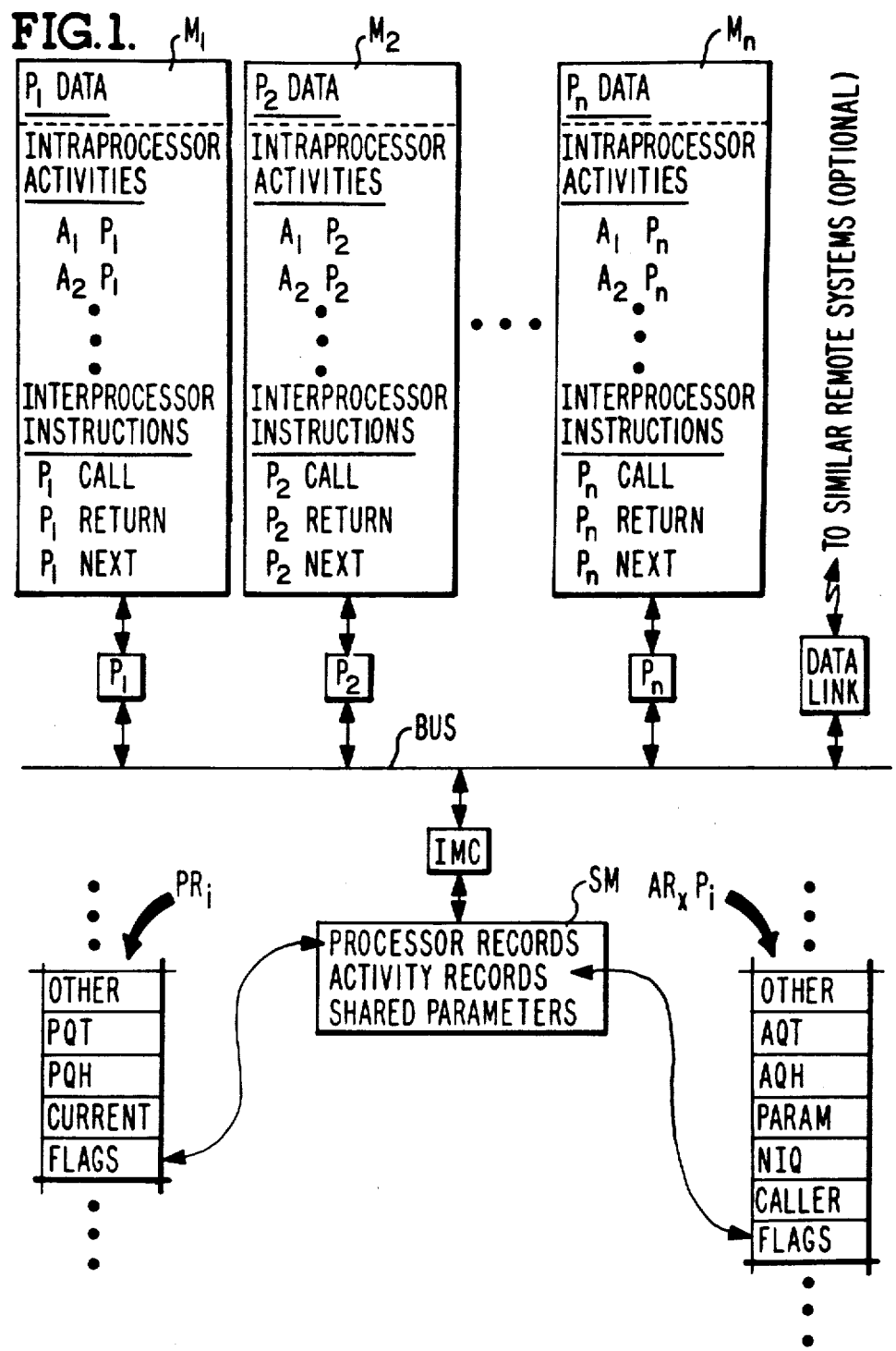
FIG. 1 illustrates a system in which sequences of activities in digital processors are synchronized according to the invention.

In FIG. 1, a plurality of "n" independent digital processors are represented by several boxes labeled $P_1$, $P_2$, ... $P_n$. These processors may be of any programmable type; and they may be the same or different from each other. Suitably, processors $P_1$ through $P_n$ are of the type described in U.S. Pat. No. 4,346,438 entitled "Digital Computer Having Programmable Structure" by H. Potash et al and assigned to Burroughs Corporation, or of the type described in U.S. Pat. No. 4,327,355 entitled "Digital Device with Interconnect Matrix" by H. Potash et al and assigned to Burroughs Corporation.

Processors $P_1$, $P_2$, ... $P_n$ are coupled to memories $M_1$, $M_2$, ... $M_n$ respectively. These memories may be any digital type memory. For example, they may be static or dynamic type semiconductor memories; and they may be made of MOS or bipolar circuitry. Also, the storage capacity and operating speed of the memories may be the same or different from each other.

One portion of memory $M_1$ contains the data that processor $P_1$ operates on; while another portion of memory $M_1$ contains the intraprocessor activities that processor $P_1$ performs. As used herein, an intraprocessor activity is comprised of a program or set of programs which direct a processor to perform a particular task by using only the resources of that processor. Such resources include the processor's own internal hardware, the processor's memory, and any peripheral equipment such as disks, tapes, etc. (not shown) connected to the processor. In FIG. 1, the respective intraprocessor activities that processor $P_1$ performs are symbolically indicated as $A_1P_1$, $A_2P_1$, ..., etc.

Similarly, a portion of memory $M_2$ contains the data that processor $P_2$ operates on; and another portion of memory $M_2$ contains the intraprocessor activities that processor $P_2$ performs. Those activities are indicated in FIG. 1 as $A_1P_2, A_2P_2, \ldots$, etc. In like fashion, memory $M_n$ contains the data that processor $P_n$ operates on; and it contains the intraprocessor activities $A_1P_n, A_2P_n, \ldots$ that processor $P_n$ performs.

Each of the memories $M_1, M_2, \ldots M_n$ also contains interprocessor instructions. They are an INTERPROCESSOR CALL, an INTERPROCESSOR RETURN, and an INTERPROCESSOR NEXT instruction. In general, these interprocessor instructions provide the means by which the processors $P_1, P_2, \ldots P_n$ communicate with one another. More specifically, they provide the means by which all of the intraprocessor activities $A_1P_1, A_1P_2, \ldots A_1P_n$, etc. are linked together and performed in an orderly synchronized sequence as is explained in much greater detail below.

Processors $P_1, P_2, \ldots P_n$ are coupled via a single time-shared bus to an intelligent memory controller IMC; and controller IMC is coupled to a shared memory SM. Controller IMC preferably is a programmable computer of the type referenced above; and memory SM may be any type of read/write memory.

Memory SM contains one separate processor record for each of the processors; and each such record is herein indicated as $PR_i$. Memory SM also contains a separate activity record for each of the intraprocessor activities in the processors; and each such record is indicated as $AR_xP_i$. Further, memory SM contains parameters that are shared and passed from one processor to another via the interprocessor instructions.

Included in each processor record $PR_i$ are flags which indicate whether processor $P_i$ is currently BUSY performing an activity or NOT BUSY. Processor record $PR_i$ also contains a CURRENT entry which points to the current intraprocessor activity that processor $P_i$ is performing if the processor is BUSY.

Processor record $PR_i$ further includes a PROCESSOR QUEUE HEAD entry (PQH), and a PROCESSOR QUEUE TAIL entry (PQT). These two entries respectively point to the head and tail of a queue of activity records for the different kinds of intraprocessor activities that processor $P_i$ is to perform. That is, a pointer to the same kind of activity is entered into the processor queue only once even though that activity may be called several times. Processor record $PR_i$ may also include other entries, as a matter of design choice, in addition to those described above.

Activity record $AR_xP_i$ includes a set of flags indicating when the corresponding activity is DORMANT, or ACTIVE, or SUSPENDED. An activity is ACTIVE when a processor is actually being used to execute that activity. An activity remains ACTIVE but in a SUSPENDED state when it has executed partway to completion and then stopped while it awaits the results of another activity in another processor. Such results are requested and obtained via the INTERPROCESSOR INSTRUCTIONS. In all other cases, an activity is DORMANT.

Activity record $AR_xP_i$ also includes a CALLER entry which is a pointer to the activity record of the activity which is first to call activity $A_xP_i$. Any subsequent callers of activity $A_xP_i$ are kept track of by means of an ACTIVITY QUEUE TAIL entry (AQT) and ACTIVITY QUEUE HEAD entry (AQH) in the activity record.

Specifically, pointers to the subsequent callers of activity $A_xP_i$ are placed in a queue of that activity. Entry AQH points to the activity record of the second caller of activity $A_xP_i$; and entry AQT points to the activity record of the last caller of activity $A_xP_i$. Intermediate entries in either the activity queue or the processor queue are linked together by a NEXT IN QUEUE entry (NIQ) in the activity records of the various callers of an activity.

Activity record $AR_xP_i$ also has a PARAMETER entry (PARAM) which contains a pointer to parameters that are passed between two activities via the INTERPROCESSOR INSTRUCTIONS. For example, when activity $A_xP_i$ calls activity $A_yP_j$, then the PARAM entry of activity record $AR_xP_i$ points to parameters in the shared memory SM on which activity $A_yP_j$ is to operate. Conversely, when activity $A_yP_j$ completes, then the PARAM entry in activity record $AR_xP_i$ points to parameters in the shared memory that are being passed by activity $A_yP_j$ to activity $A_xP_i$.

One example of a complete set of the processor records and activity records for a FIG. 1 system is illustrated in FIG. 2. In this example, there are eleven processor records $PR_1$ through $PR_{11}$ which respectively represent eleven physical processors $P_1$ through $P_n$. Also in this example, the number of activities that each processor performs varies from processor to processor.

FIG. 2 shows that processor 1 performs five intraprocessor activities; and the above-described pointers for those activities are respectively in activity records $AR_1P_1$ through $AR_5P_1$. In like manner, FIG. 2 shows that processor 2 performs eleven intraprocessor activities, processor 3 performs nine intraprocessor activities, processor 4 performs three intraprocessor activities, etc. Again, these activity records and processor records each have their own pointers that keep track of which activity is calling which; and resolve the order by which the various processors perform their respective intraprocessor activities.

Consider now the details of the operations that are performed by the controller IMC in response to the INTERPROCESSOR CALL instruction. TABLE 1 below lists those operations for the generalized case where activity $A_xP_i$ in processor $P_i$ calls activity $A_yP_j$ in processor $P_j$.

TABLE 1

| \($A_xP_i$ CALLS $A_yP_j$\) | | |
|---|---|---|
| $AR_yP_j$ | $PR_j$ | ACTION TAKEN |
| DORMANT | NOT BUSY | SET $AR_yP_j$ ACTIVE |
| | | $AR_xP_i$ POINTER → $AR_yP_j$ CALLER |
| | | $AR_yP_j$ POINTER → $PR_j$ CURRENT |
| | | SET $PR_j$ BUSY |
| | | NOTIFY $P_j$ |
| DORMANT | BUSY | SET $AR_yP_j$ ACTIVE |
| | | $AR_xP_i$ POINTER → $AR_yP_j$ CALLER |
| | | $AR_yP_j$ POINTER → $PR_j$ QUEUE |
| ACTIVE | 0 | $AR_xP_i$ POINTER → $AR_yP_j$ QUEUE |
| $PR_j$ QUEUE | | ACTION TAKEN |
| NOT EMPTY | | POP $PR_j$ QUEUE |
| | | POPPED ENTRY → $PR_j$ CURRENT |
| | | NOTIFY $P_j$ |
| | | ($AR_xP_i$ REMAINS ACTIVE) |
| EMPTY | | SET $PR_j$ NOT BUSY |
| | | 0 → $PR_j$ CURRENT |
| | | ($AR_xP_i$ REMAINS ACTIVE) |

If activity $A_yP_j$ is DORMANT and processor $P_j$ is NOT BUSY, then controller IMC performs the following tasks. First it makes activity $A_yP_j$ ACTIVE by setting the ACTIVE flag in activity record $AR_yP_j$. Then it loads a pointer to activity record $AR_xP_i$ into the CALLER entry of activity record $AR_yP_j$. Also, a pointer to activity record $AR_yP_j$ is loaded into the CURRENT entry of processor record $PR_j$. Then the BUSY flag for processor record $PR_j$ is set, and a message is sent to processor $P_j$ which notifies it to start performing activity $A_yP_j$.

If, however, activity $A_yP_j$ is DORMANT and processor $P_j$ is BUSY at the time of the INTERPROCESSOR CALL, then controller IMC operates as follows. First it sets the ACTIVE flag in activity record $AR_yP_j$. Then it loads a pointer to activity record $AR_xP_i$ into the CALLER location of activity record $AR_yP_j$. Then it loads a pointer to activity record $AR_yP_j$ into the queue of processor record $PR_j$. This latter operation involves loading a pointer to activity record $AR_yP_j$ into the NEXT IN QUEUE entry of the activity record that is pointed to by the PROCESSOR QUEUE TAIL of processor record $PR_j$; and then changing the PROCESSOR QUEUE TAIL entry of processor record $PR_j$ such that it also points to activity record $AR_yP_j$.

Finally, if activity $A_yP_j$ is ACTIVE at the time of the INTERPROCESSOR CALL, then the intelligent memory controller loads a pointer to activity record $AR_xP_j$ into the queue of activity record $AR_yP_j$. This involves loading a pointer to activity record $AR_xP_i$ into the NEXT IN QUEUE entry of the activity record that is pointed to by the ACTIVITY QUEUE TAIL of activity record $AR_yP_j$; and then changing the ACTIVITY QUEUE TAIL in activity record $AR_yP_j$ to point to activity record $AR_xP_i$.

Note that the above operations only affect the CALLED activity record and CALLED processor record. But in addition, various operations must also be performed on the CALLING activity record and CALLING processor record. These operations are as follows.

If the queue in the CALLING processor record $PR_i$ is NOT EMPTY, then one entry is removed from that queue and loaded into the CURRENT entry of processor record $PR_i$. This unloading operation involves moving the PROCESSOR QUEUE HEAD entry of processor record $PR_i$ into the CURRENT entry of processor record $PR_i$; and then the NEXT IN QUEUE entry from the activity record that is pointed to by the PROCESSOR QUEUE HEAD in processor record $PR_i$ is loaded into the PROCESSOR QUEUE HEAD of processor record $PR_i$. Also, a message is sent by the controller IMC to processor $P_i$ which notifies that processor of the new activity that is pointed to by the CURRENT entry in the processor record $PR_i$.

If, on the other hand, the queue in processor record $PR_i$ is EMPTY, then the flags in that processor record are set to indicate that processor $P_i$ is NOT BUSY. Also, under those conditions, the CURRENT entry in processor record $PR_i$ is set to a null value. Note further that in both this and the above case, the ACTIVE flag in the calling activity record $AR_xP_i$ remains set, even though the calling activity is in a suspended state.

Next, consider the operations that are performed by the controller IMC in response to an INTERPROCESSOR RETURN instruction from one of the processors. Specifically, consider the case where activity $A_yP_j$ in processor $P_j$ RETURNS to activity $A_xP_i$ in processor $P_i$. These operations are listed in TABLE 2 below.

If the queue of activity record $AR_yP_j$ is NOT EMPTY when the RETURN occurs, then the controller IMC performs the following operations. Firstly, one entry is removed from the queue of activity record $AR_yP_j$. This is achieved by moving the pointer in the ACTIVITY QUEUE HEAD of activity record $AR_yP_j$ into the CALLER location of activity record $AR_yP_j$; and moving the NEXT IN QUEUE entry of the activity record that is pointed to by the ACTIVITY QUEUE HEAD of activity record $AR_yP_j$ into the ACTIVITY QUEUE HEAD of activity record $AR_yP_j$.

TABLE 2

| ($A_yP_j$ RETURNS TO $A_xP_i$) | | |
|---|---|---|
| $AR_yP_j$ | $PR_j$ | ACTION TAKEN |
| QUEUE NOT EMPTY | | POP $AR_yP_j$ QUEUE NOTIFY $P_j$ TO RE-EXECUTE $AR_yP_j$ |
| QUEUE EMPTY | QUEUE NOT EMPTY | SET $AR_yP_j$ DORMANT POP $PR_j$ QUEUE POPPED ENTRY → $PR_j$ CURRENT NOTIFY $P_j$ |
| QUEUE EMPTY | QUEUE EMPTY | SET $PR_j$ NOT BUSY 0 → $PR_j$ CURRENT |
| | $PR_i$ BUSY NOT BUSY | ACTION TAKEN $AR_xP_i$ POINTER → $PR_i$ QUEUE $AR_xP_i$ POINTER → $PR_i$ CURRENT NOTIFY $P_i$ |

Thereafter, a message is sent to processor $P_j$ to re-execute activity $A_yP_j$ for the new caller of that activity.

On the other hand, if the queue of activity $A_yP_j$ is EMPTY but the queue of processor $P_j$ is NOT EMPTY when the RETURN instruction is sent to the controller IMC, then that controller performs the following operations. Firstly, the flags in activity record $AR_yP_j$ are changed to indicate a DORMANT state. Then one entry is removed from the queue of the processor record $PR_j$ and the CURRENT entry in that processor record is updated with that entry that is removed from the queue. Then a message is sent to processor $P_j$ which informs the processor of the new activity record that is being pointed to by the CURRENT entry in processor record $PR_j$.

Finally, if the queue of activity record $AR_yP_j$ and the queue of processor record $PR_j$ are both EMPTY when the RETURN instruction is sent to the controller IMC, then there are no other activities for processor $P_j$ to currently perform. Consequently, the flags in processor record $PR_j$ are set to indicate that processor $P_j$ is NOT BUSY; and the CURRENT entry in processor record $PR_j$ is set to a null state.

All of the above operations for the RETURN instruction are performed on the CALLED activity record $AR_yP_j$ and CALLED processor record $PR_j$. In addition, the following operations are performed in response to the RETURN instruction on the CALLING activity record $AR_xP_i$ and CALLING processor record $PR_i$.

If the flags in the CALLING processor record $PR_i$ indicate that processor $P_i$ is BUSY, then the intelligent memory controller loads a pointer to activity record $AR_xP_i$ into the queue of processor record $PR_i$. This is performed, when the queue of processor record $PR_i$ is not empty, by loading the pointer to activity record $AR_xP_i$ into the NEXT IN QUEUE entry of the activity record that is pointed to by the PROCESSOR QUEUE TAIL in processor record $PR_i$; and by changing the PROCESSOR QUEUE TAIL entry to also point to activity record $AR_xP_i$. And it is achieved, when the queue of processor record $PR_i$ is empty, by loading the pointer to activity record $AR_xP_i$ into the PROCESSOR QUEUE HEAD and PROCESSOR QUEUE TAIL of processor record $PR_i$.

If, however, processor $P_i$ is NOT BUSY, then the pointer to activity record $AR_xP_i$ is loaded into the CURRENT entry of processor record $PR_i$; and the flags of processor record $PR_i$ are set to indicate that processor $P_i$ is BUSY. Then a message is sent to processor $P_i$ to notify the processor of the new activity that it is to perform as indicated by the new CURRENT entry in processor record $PR_i$.

Consider now the operations that are performed by the controller IMC in response to an INTERPROCESSOR NEXT instruction from one of the processors. Specifically, consider the actions that are taken in the generalized case where activity $A_yP_j$ in processor Pj performs a NEXT instruction to activity $A_zP_k$ in processor $P_k$. These operations are listed in TABLE 3 below.

Those operations which are performed on activity record $AR_yP_j$ and processor record $PR_j$ in response to the NEXT instruction are the same as the operations which are performed on activity record $AR_yP_j$ and processor record $PR_j$ in response to the RETURN instruction as described above. But the operations that are performed in response to the NEXT instruction on activity record $AR_zP_k$ and processor record $PR_k$ are as follows.

If activity $A_zP_k$ is ACTIVE, then a pointer to activity record $AR_xP_i$ gets loaded into the activity queue of activity record $AR_zP_k$. This is achieved by moving the CALLER entry of activity record $AR_yP_k$ into the activity queue of activity record $AR_z$.

If, however, activity $A_zP_k$ is DORMANT and processor $P_k$ is BUSY at the time the NEXT instruction is sent to controller IMC, then that controller performs the following operations. First, a pointer to activity record $AR_zP_k$ is loaded into the queue of processor record $PR_k$. Then, the CALLER entry of activity record $AR_yP_j$ (which is a pointer to activity record $AR_xP_i$) is moved to the CALLER entry of activity record $AR_zP_k$. Then, the flags in activity record $AR_zP_k$ are set to an ACTIVE state.

TABLE 3

| $AR_yP_j$ | $PR_j$ | ACTION TAKEN |
|---|---|---|
| QUEUE NOT EMPTY | | POP $AR_yP_j$ QUEUE<br>NOTIFY $P_j$ TO RE-EXECUTE $AR_yP_j$ |
| QUEUE EMPTY | QUEUE NOT EMPTY | SET $AR_yP_j$ DORMANT<br>POP $PR_j$ QUEUE<br>POPPED ENTRY → $PR_j$ CURRENT<br>NOTIFY $P_j$ |
| QUEUE EMPTY | QUEUE EMPTY | SET $PR_j$ NOT BUSY<br>O → $PR_j$ CURRENT |
| $AR_zP_k$ | $PR_k$ | ACTION TAKEN |
| ACTIVE | O | $AR_xP_i$ POINTER → $AR_zP_k$ QUEUE |
| DORMANT | BUSY | $AR_zP_k$ POINTER → $PR_k$ QUEUE<br>$AR_xP_i$ POINTER → $AR_zP_k$ CALLER<br>SET $AR_zP_k$ ACTIVE |
| DORMANT | NOT BUSY | $AR_zP_k$ POINTER → $PR_k$ CURRENT<br>$AR_xP_i$ POINTER → $AR_zP_k$ CALLER<br>SET $AR_zP_k$ ACTIVE |

On the other hand, if processor $P_k$ is NOT BUSY at the time that the NEXT instruction is sent to the intelligent memory controller, then that controller performs the following operations. The pointer to activity record $AR_zP_k$ is loaded into the CURRENT entry of processor record $PR_k$. Also, the CALLER entry of activity record $AR_yP_j$ (which is a pointer to activity record $AR_xP_i$) is loaded into the CALLER entry of activity record $AR_zP_k$. Then the flags in activity record $AR_zP_k$ are set to an ACTIVE state.

Figure 3:
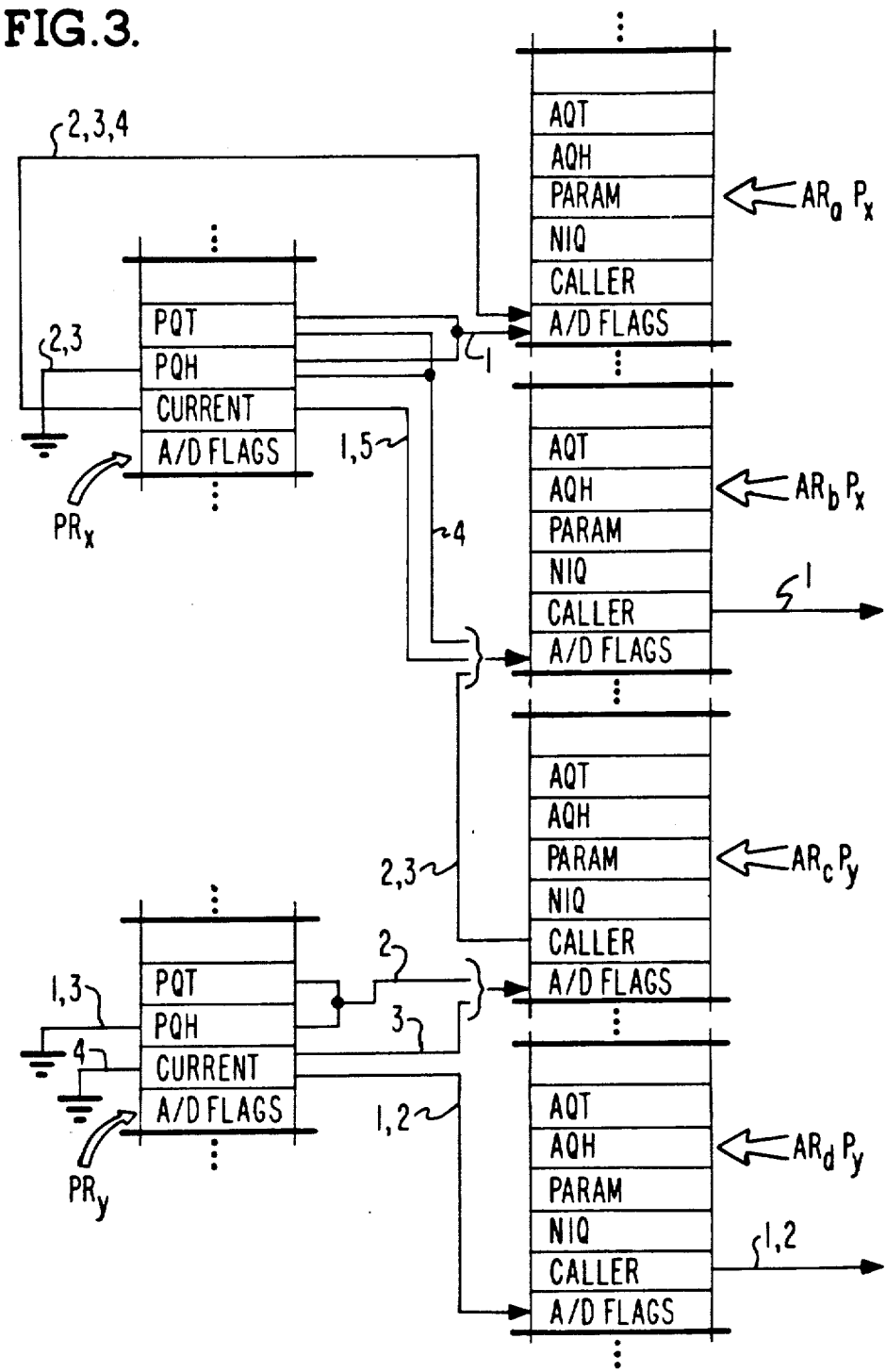
FIGS. 3, 4, 5, and 6 illustrate examples of how the pointers in the processor records and activity records of the FIG. 1 system change in response to the execution of INTERPROCESSOR instructions.

Reference should now be made to FIG. 3. It illustrates an exemplary sequence of the above-described changes that occur to the processor records and activity records during a CALL and corresponding RETURN operation. That sequence occurs during time instants $t_1$ through $t_5$; and TABLE 4 below outlines the events which occur at each time instant.

TABLE 4

| TIME | ACTION TAKEN |
|---|---|
| $t_1$ | $P_x$ performing $A_bP_x$, $P_y$ performing $A_dP_y$ |
| $t_2$ | $P_x$ CALLS $A_cP_y$, suspends $A_bP_x$, & starts $A_aP_x$ |
| $t_3$ | $P_y$ completes $A_dP_y$ and starts $A_cP_y$ |
| $t_4$ | $P_y$ completes $A_cP_y$ and RETURNS to $A_bP_x$ |
| $t_5$ | $P_x$ completes $A_aP_x$ and RETURNS to $A_bP_x$ |

In this example, there are two processors $P_x$ and $P_y$; and they have processor records $PR_x$ and $PR_y$ respectively. Initially, processor $P_x$ is BUSY performing an activity $A_bP_x$ which has an activity record $AR_bP_x$. Also, another activity $A_aP_x$ which has an activity record $AR_aP_x$ is waiting in the $PR_x$ processor queue to be performed; and Processor $P_y$ is BUSY performing an activity $A_cP_y$. These initial conditions are indicated in FIG. 3 by the pointers having reference numeral 1.

Specifically, the CURRENT entry with reference numeral 1 in processor record $PR_x$ points to activity record $AR_bP_x$ to indicate that processor $P_x$ is initially performing activity $A_bP_x$. Also, the PROCESSOR QUEUE HEAD entry and PROCESSOR QUEUE TAIL entry with reference numeral 1 in processor record $PR_x$ point to activity record $AR_aP_x$ to indicate that activity $A_aP_x$ is initially in the queue of processor record $PR_x$.

Further, the CURRENT entry with reference numeral 1 of processor record $PR_y$ points to activity record $AR_dP_y$ to indicate that initially processor $P_y$ is performing activity $A_dP_y$. And, the PROCESSOR QUEUE HEAD entry with reference numeral 1 of processor record $PR_y$ has a null value to indicate that no other activities are waiting to be performed on processor $P_y$.

Subsequently, as indicated by the pointers in the records having reference numeral 2, activity $A_bP_x$ CALLS activity $A_cP_y$. As a result, the CALLER entry in activity record $AR_cP_y$ is written such that it points to activity record $AR_bP_x$; and the PROCESSOR QUEUE HEAD and PROCESSOR QUEUE TAIL entries in processor record $PR_y$ are written such that they point to activity record $AR_cP_y$.

Also, since activity $A_bP_x$ was a CALLER, processor $P_x$ suspends execution of that activity and begins execution of another activity which it gets from its queue. Consequently, the CURRENT entry in processor record $PR_x$ is written to point to activity record $AR_aP_x$; and the PROCESSOR QUEUE HEAD entry of processor record $PR_x$ is written to a null value.

Subsequently, as indicated by the record entries having reference numeral 3, processor $P_y$ completes the execution of activity $A_dP_y$; and thus it starts the execution of another activity in its queue. Thus, the CURRENT entry in processor record $PR_y$ is written to point to activity record $AR_cP_y$ and the PROCESSOR QUEUE HEAD entry of processor record $PR_y$ is written to a null value.

Thereafter, as indicated by the record entries having reference numeral 4, processor $P_y$ completes the execution of activity $A_cP_y$. Thus, the activity that CALLED activity $A_cP_y$ can resume execution; and so a pointer to activity record $AR_bP_x$ is loaded into the PROCESSOR QUEUE HEAD and PROCESSOR QUEUE TAIL entries of processor record $PR_x$. Also, processor $P_y$ is free to perform another activity; but since its processor queue is EMPTY, the CURRENT pointer of processor record $PR_y$ is written to a null value.

Processor $P_x$ continues with the execution of activity $A_aP_x$ until that activity completes or calls another activity. That occurs at time $t_5$. Then, processor $P_x$ resumes execution of activity $A_bP_x$ since activity record $AR_bP_x$ is pointed to by the processor queue of processor record $PR_x$.

Figure 4:
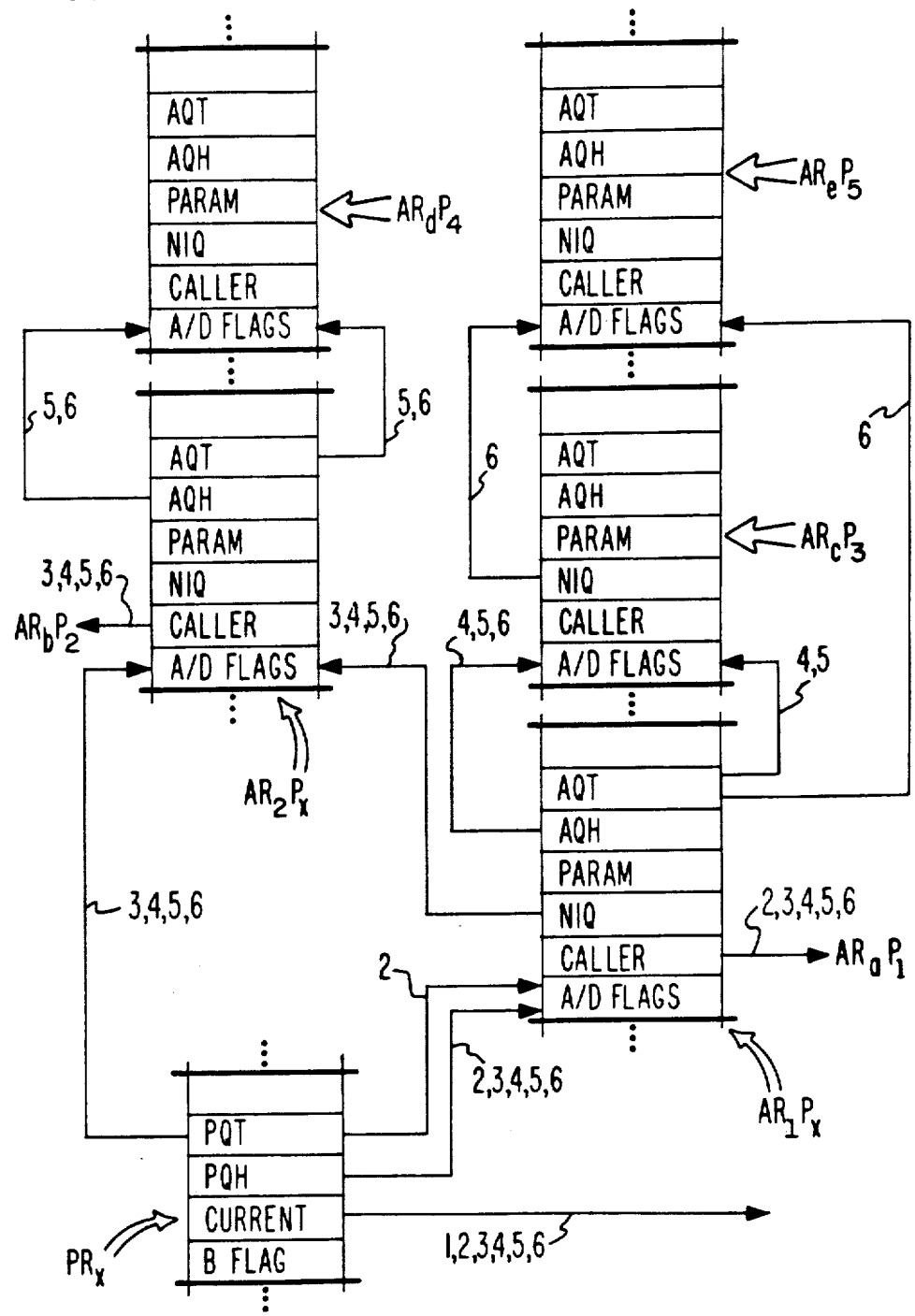
Figure 5:
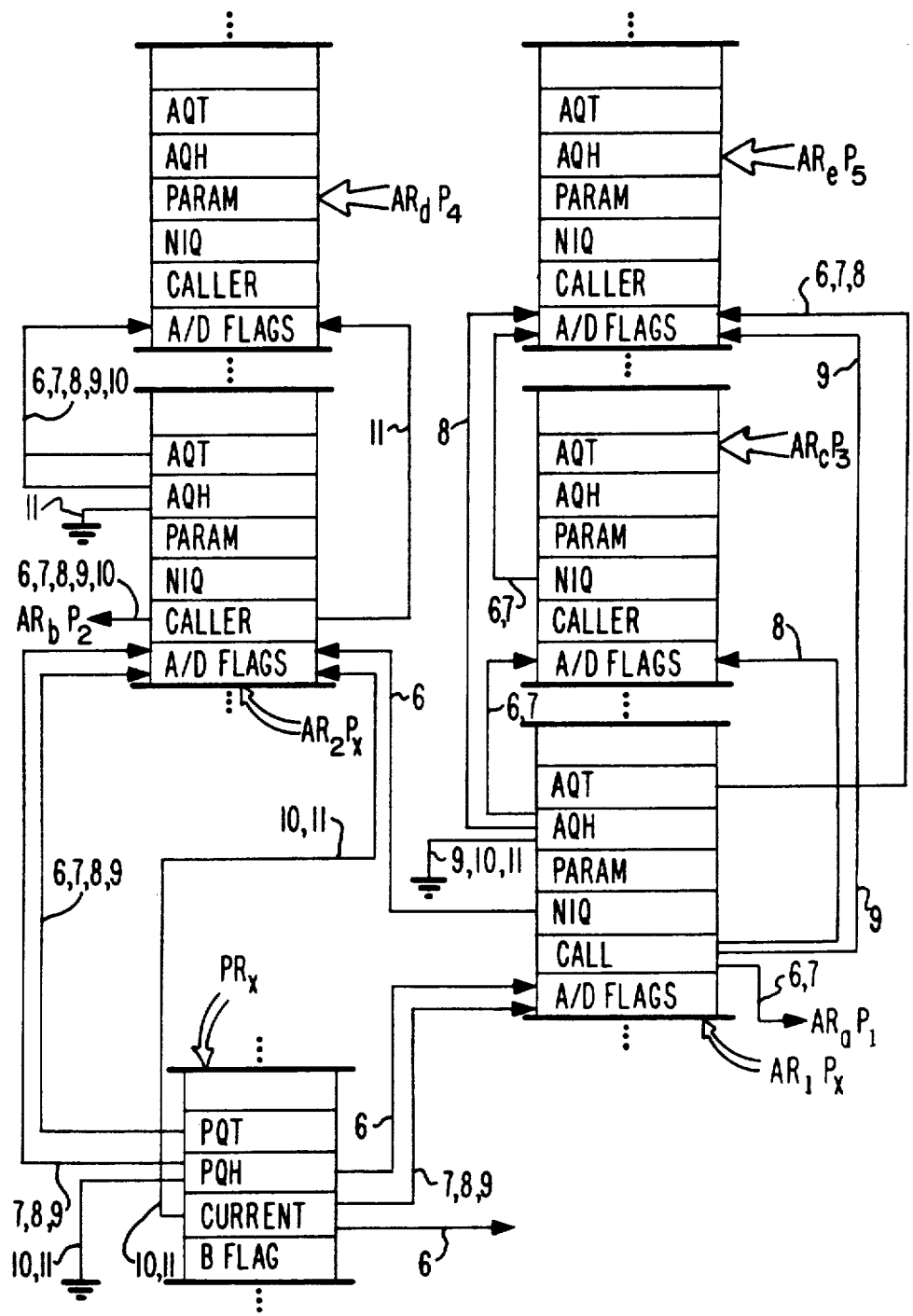

Referring now to FIGS. 4 and 5, another example of a sequence of the changes that occur to the processor records and activity records during several CALL and RETURN operations will be described. In this example, an activity $A_1P_x$ which processor $P_x$ performs is CALLED three times and another activity $A_2P_x$ which processor $P_x$ also performs is CALLED two times.

All of this calling occurs while processor $P_x$ is busy performing another activity; so the queues in processor records $PR_x$ and activity records $AR_1P_x$ and $AR_2P_x$ get loaded while the calling occurs. Subsequently, processor $P_x$ finishes the task that it was performing; and then it performs the activities which are pointed to in the queues of the processor and activity records. TABLE 5 below lists the sequence by which the various events occur.

TABLE 5

| TIME | ACTION TAKEN |
| --- | --- |
| $t_1$ | $P_x$ performing some activity |
| $t_2$ | $A_aP_1$ CALLS $A_1P_x$ |
| $t_3$ | $A_bP_2$ CALLS $A_2P_x$ |
| $t_4$ | $A_cP_3$ CALLS $A_1P_x$ |
| $t_5$ | $A_dP_4$ CALLS $A_2P_x$ |
| $t_6$ | $A_eP_5$ CALLS $A_1P_x$ |
| $t_7$ | $P_x$ RETURNS to $A_1P_x$ for $A_aP_1$ |
| $t_8$ | $P_x$ RETURNS to $A_1P_x$ for $A_cP_3$ |
| $t_9$ | $P_x$ RETURNS to $A_1P_x$ for $A_eP_5$ |
| $t_{10}$ | $P_x$ RETURNS to $A_2P_x$ for $A_bP_2$ |
| $t_{11}$ | $P_x$ RETURNS to $A_2P_x$ for $A_dP_4$ |

FIG. 4 illustrates the sequence by which the processor and activity record queues get loaded; while FIG. 5 illustrates the sequence by which the queues get unloaded. In both of these figures, the pointers having reference numerals 1 through 11 respectively indicate the various entries in the processor and activity records at sequential time instants which correspond to those numbers.

Inspection of FIG. 4 shows that during time instants $t_1$–$t_6$, the CURRENT entry of processor record $PR_x$ is pointing to an activity record which processor $P_x$ is currently performing. But at time instant $t_2$, an activity $A_aP_1$ in processor $P_1$ CALLS activity $A_1P_x$ in processor $P_x$. As a result, the CALLER entry of activity record $AR_1P_x$ is written such that it points to activity record $AR_aP_1$; and the PROCESSOR QUEUE HEAD and PROCESSOR QUEUE TAIL entries of processor record $PR_x$ are written such that they point to activity record $AR_1P_x$.

Thereafter, at time instant $t_3$, an activity $A_bP_2$ in processor $P_2$ CALLS activity $A_2P_x$ in processor $P_x$. As a result of this CALL, the CALLER entry in activity record $AR_2P_x$ is written to point to activity record $AR_bP_2$. Also, the PROCESSOR QUEUE TAIL entry of processor record $PR_x$ is changed to point to activity record $AR_2P_x$; and the NEXT IN QUEUE entry of activity record $AR_1P_x$ is written to point to activity record $AR_2P_x$.

Subsequently, at time instant $t_4$, an activity $A_cP_3$ in processor $P_3$ CALLS activity $A_1P_x$. This CALL of activity $A_1P_x$ does not reload activity record $AR_1P_x$ into the queue of processor record $PR_x$; but instead, a pointer to activity record $AR_cP_3$ is written into the activity queue of activity record $AR_1P_x$. This is achieved by writing the ACTIVITY QUEUE HEAD and ACTIVITY QUEUE TAIL entries of activity record $AR_1P_x$ such that they point to activity record $AR_cP_3$.

Next, at time instant $t_5$, an activity $A_dP_4$ in a processor $P_4$ CALLS activity $A_2P_x$. Again, since the activity record $AR_2P_x$ is already in the processor queue of processor record $PR_x$, a pointer to activity record $AR_dP_4$ is simply loaded into the activity queue of activity record $AR_2P_x$. This is achieved by writing the ACTIVITY QUEUE HEAD and ACTIVITY QUEUE TAIL entries of activity record $AR_2P_x$ such that they point to activity record $AR_dP_4$.

Then, at time instant $t_6$, an activity $A_eP_5$ in a processor $P_5$ CALLS activity $A_1P_x$. As a result, activity record $AR_eP_5$ is loaded into the activity queue of activity record $AR_1P_x$. This is achieved by changing the ACTIVITY QUEUE TAIL entry of activity record $AR_1P_x$ such that it points to activity record $AR_eP_5$; and by writing the NEXT IN QUEUE entry of activity record $AR_cP_3$ such that it also points to activity record $AR_eP_5$.

Turning now to FIG. 5, the unloading of the queues in processor record $PR_x$, activity record $AR_1P_x$, and $AR_2P_x$ will be described. In FIG. 5, those pointers having reference numeral 6 are the same as the pointers having reference numeral 6 in FIG. 4.

At time instant $t_7$, processor $P_x$ completes the activity which it was working on at time instants $t_1$ through $t_6$. Thus it performs an INTERPROCESSOR RETURN instruction. In response thereto, the controller IMC removes an activity record from the queue in processor record $PR_x$ and notifies processor record $PR_x$ of that removed activity. This removal operation is achieved via controller IMC by moving the PROCESSOR QUEUE HEAD entry in processor record $PR_x$ to the CURRENT entry in that processor record; and by moving the NEXT IN QUEUE entry of activity record $AR_1P_x$ to the PROCESSOR QUEUE HEAD entry of processor record $PR_x$.

Thereafter, at time instant $t_8$, processor $P_x$ completes activity $A_1P_x$. Thus it performs another INTERPROCESSOR RETURN instruction. In response to that RETURN instruction, controller IMC removes one activity record from the activity queue of activity record $AR_1P_x$. This it achieves by moving the ACTIVITY QUEUE HEAD entry in activity record $AR_1P_x$ to the CALLER entry of that record; and by moving the NEXT IN QUEUE entry of activity record $AR_cP_3$ into the ACTIVITY QUEUE HEAD entry of activity record $AR_1P_x$. Then processor $P_x$ is notified that it should re-execute activity $A_1P_x$ for the second caller of that activity.

At time instant $t_9$, processor $P_x$ again completes the execution of activity $A_1P_x$. Thus, it again executes an INTERPROCESSOR RETURN instruction. In response thereto, the controller IMC removes another activity record from the activity queue of activity record $AR_1P_x$. This it achieves by moving the ACTIVITY QUEUE HEAD entry of activity record $AR_1P_x$ into the CALLER entry of that activity and by setting the ACTIVITY QUEUE HEAD entry of activity record $AR_1P_x$ to a null value. Then, controller IMC informs processor $P_x$ to re-execute activity $A_1P_x$ for the third caller of that activity.

Thereafter, at time instant $t_{10}$, processor $P_x$ completes the execution of activity $A_1P_x$; and so it again executes an INTERPROCESSOR RETURN instruction. In response thereto, controller IMC removes another activity record from the processor queue of processor record $PR_x$; and it informs processoor $P_x$ of the new activity that it is to perform. This removal operation is achieved by moving the PROCESSOR QUEUE HEAD entry of processor record $PR_x$ into the CURRENT entry of that record and by changing the PROCESSOR QUEUE HEAD entry in processor record $PR_x$ to a null value.

Next, at time instant $t_{11}$, processor $P_x$ completes the execution of activity $A_2P_x$. Thus it again executes an INTERPROCESSOR RETURN instruction. In response thereto, controller IMC removes an entry from the activity queue of activity record $AR_2P_x$ and informs processor $P_x$ to re-execute activity $A_2P_x$ for the second caller of that activity. This removal operation is achieved by moving the ACTIVITY QUEUE HEAD entry of activity record $AR_2P_x$ to the CALLER entry of that activity and by setting the ACTIVITY QUEUE HEAD entry of activity record $AR_2P_x$ to a null value.

After processor $P_x$ completes the execution of activity $A_2P_x$, it will again execute an INTERPROCESSOR RETURN instruction. At that point, there are no other activities for processor $P_x$ to perform; and so controller IMC merely resets the BUSY flag in processor record $PR_x$ and sets the CURRENT entry of that record to a null value.

From the above sequence of operations, it can be seen that the order in which processor $P_x$ performed activities $A_1P_x$ and $A_2P_x$ was entirely different than the order in which those activities were called. Specifically, the activities were called in the following order: $A_1P_x$, $A_2P_x$, $A_1P_x$, $A_2P_x$, and $A_1P_x$; but the order in which the activities were performed was: $A_1P_x$, $A_1P_x$, $A_1P_x$, $A_2P_x$, and $A_2P_x$.

In other words, activity $A_1P_x$ was performed once for every one of its callers; and then activity $A_2P_x$ was performed once for every one of its callers. And this occurs regardless of the order in which those activities are called. Such re-ordering of the activities is important because it minimizes the number of times that a processor switches from performing one activity to another.

Each time a switch occurs, the code for the new activity must be read into the memory of the processor which is to perform the activity. Also, space must be re-allocated in the memory for data on which the activity performs. These resource-allocating operations are time-consuming; and thus they detract from the overall performance of the system.

Figure 6:
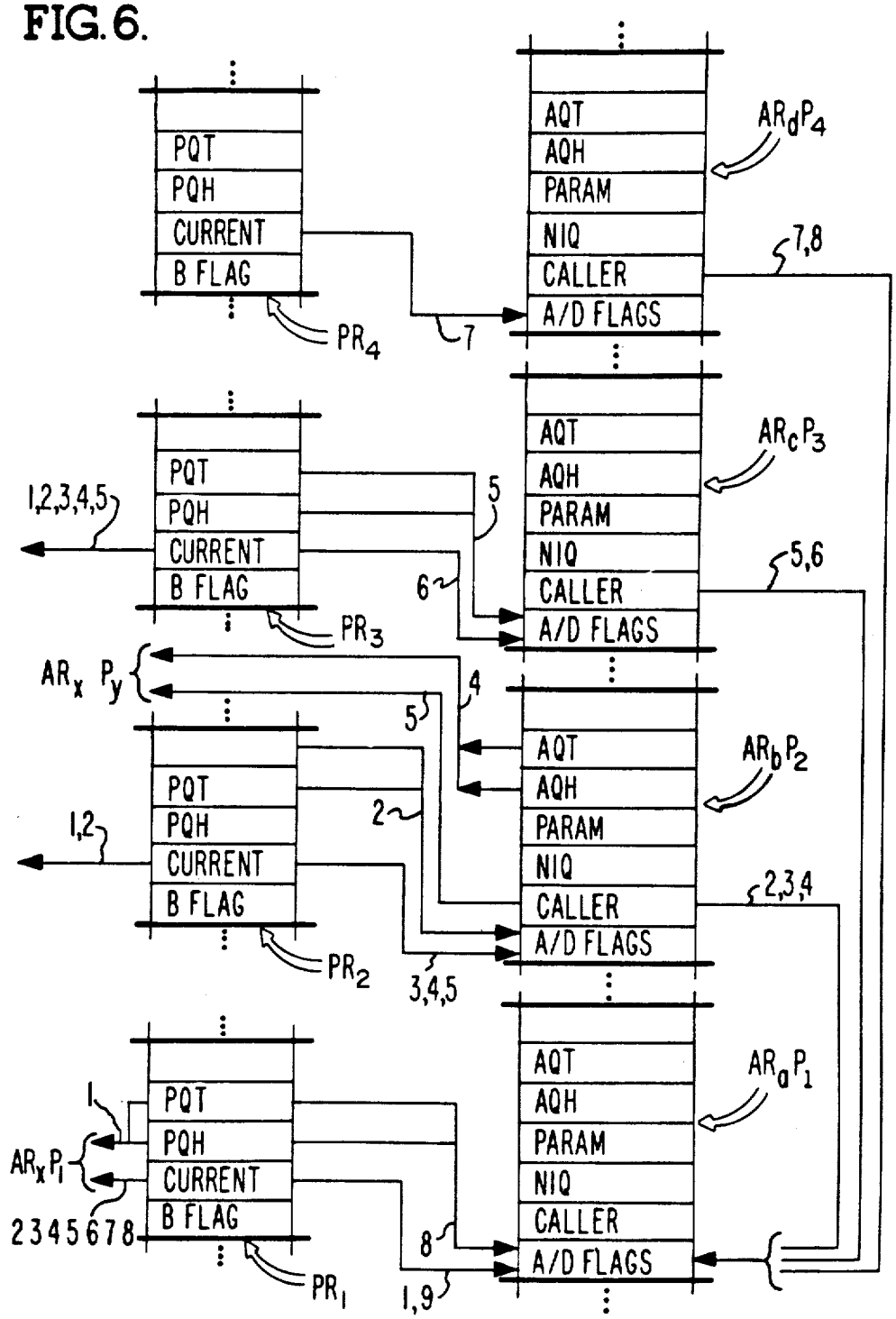

Reference should now be made to FIG. 6 which illustrates the operation of the INTERPROCESSOR NEXT instruction. In this figure, as in the previous FIGS. 3-5, the pointers having reference numerals 1 through 9 indicate respective entries in the activity records and processor records at time instants which correspond to those reference numerals.

TABLE 6 below lists the sequence of events that occur in FIG. 6 in outline form. This outline shows a sequence in which an activity $A_aP_1$ calls another activity $A_bP_2$; then activity $A_bP_2$ executes a NEXT instruction to an activity $A_cP_3$; then activity $A_cP_3$ executes a NEXT instruction to an activity $A_dP_4$; then activity $A_dP_4$ returns directly to $A_aP_1$ without reentering activities $A_bP_2$ or $A_cP_3$.

TABLE 6

| TIME | ACTION TAKEN |
|---|---|
| $t_1$ | $P_1$ executes $A_aP_1$ |
| $t_2$ | $P_1$ CALLS $A_bP_2$, suspends $A_aP_1$ |
| $t_3$ | $P_2$ begins $A_bP_2$ for $A_aP_1$ |
| $t_4$ | $P_2$ continues to execute $A_bP_2$ for $A_aP_1$ while $A_xP_4$ CALLS $A_bP_2$ |
| $t_5$ | $P_2$ executes a NEXT from $A_bP_2$ to $A_cP_3$ with $A_aP_1$ as CALLER |
| $t_6$ | $P_3$ executes $A_cP_3$ for $A_aP_1$ |
| $t_7$ | $P_3$ executes a NEXT from $A_cP_3$ to $A_dP_4$ with $A_aP_1$ as CALLER |
| $t_8$ | $P_4$ executes $A_dP_4$ for $A_cP_1$ and RETURNS to $A_aP_1$ |
| $t_9$ | $P_1$ continues execution of $A_aP_1$ |

Inspection of FIG. 6 shows that at time $t_1$, processor $P_1$ is executing an activity $A_aP_1$. That is because at time $t_1$, the CURRENT entry in processor record $PR_1$ is pointing to activity record $AR_aP_1$.

Next, at time $t_2$, activity $A_aP_1$ SUSPENDS its execution by CALLING activity $A_bP_2$ in processor $P_2$. As a result, the CALLER entry in activity record $AR_bP_2$ is written by controller IMC such that it points to activity record $AR_aP_1$. Also, since processor record $PR_2$ indicates that processor $P_2$ is currently busy performing another activity at time instant $t_2$, the PROCESSOR QUEUE HEAD and PROCESSOR QUEUE TAIL entries of processor record $PR_2$ are written by controller IMC to point to activity record $AR_bP_2$.

Subsequently, at time $t_3$, processor $P_2$ completes the execution of its current activity by performing an INTERPROCESSOR RETURN instruction. As a result, controller IMC moves the PROCESSOR QUEUE HEAD entry of processor record $PR_2$ to the CURRENT entry of that record; and so the execution of activity $A_bP_2$ begins.

Subsequently, at time $t_4$, another activity $A_xP_y$ CALLS activity $A_bP_2$. Accordingly, since activity $A_bP_2$ is in an ACTIVE state, a pointer to activity record $AR_xP_y$ is written by controller IMC into the activity queue of activity record $AR_bP_2$.

Next, at time $t_5$, activity $A_bP_2$ performs an INTERPROCESSOR NEXT instruction to activity $A_cP_3$. As a result, controller IMC moves the CALLER entry of activity record $AR_bP_2$ to the CALLER entry of activity record $AR_cP_3$. Thus, the pointers in activity record $AR_cP_3$ are exactly as if activity $A_cP_3$ had been called directly by activity $A_aP_1$.

As a result of the above moving of the CALLER entry, activity $A_bP_2$ will not receive any parameters from activity $A_cP_3$. Instead, those parameters will be passed directly to activity $A_aP_1$. Thus, upon execution of the INTERPROCESSOR NEXT instruction, activity $A_bP_2$ is free to be re-executed by additional callers of that activity. Accordingly, at time $t_5$, controller IMC moves the ACTIVITY QUEUE HEAD entry of activity record $AR_bP_2$ into the CALLER entry of that activity record; and it notifies processor $P_2$ to re-execute activity $A_bP_2$ for its new caller.

At time $t_6$, processor $P_3$ completes the execution of the activity that it was previously executing; and so it performs an INTERPROCESSOR RETURN instruction. As a result, controller IMC moves the pointer to activity record $AR_cP_3$ from the PROCESSOR QUEUE HEAD entry to the CURRENT entry of processor record $PR_3$. Processor $P_3$ then begins execution of activity $A_cP_3$.

Upon completion of activity $A_cP_3$ at time $t_7$, processor $P_3$ has the option to perform either an INTERPROCESSOR RETURN instruction or another INTERPROCESSOR NEXT instruction. In FIG. 6, an INTERPROCESSOR NEXT instruction is performed to activity $A_dP_4$. As a result, controller IMC moves the CALLER entry of activity record $AR_cP_3$ to the CALLER entry of activity record $AR_dP_4$. Also, since processor $P_4$ is not busy, the CURRENT entry of processor record $PR_4$ is loaded by controller IMC with a pointer to activity record $AR_dP_4$; and processor $P_4$ is notified to begin execution of activity $A_dP_4$.

At time $t_8$, processor $P_4$ completes execution of activity $A_dP_4$. Thus, processor $P_4$ has the option of performing either an INTERPROCESSOR RETURN instruction or an INTERPROCESSOR NEXT instruction. In FIG. 6, processor $P_4$ performs an INTERPROCESSOR RETURN instruction.

Due to the INTERPROCESSOR RETURN, controller IMC loads the CALLER entry of activity record $AR_dP_4$ into the processor queue of processor record $PR_1$. Thereafter, at time $t_9$, processor $P_1$ completes the execution of the activity that it was previously performing; and it resumes the execution of activity $A_aP_1$ which it had previously suspended back at time $t_2$.

This resumption of the execution of activity $A_aP_1$ is possible since the parameters which that activity was waiting for from the CALLED activity $A_aP_2$ were made available at time $t_8$. But from the above, it is evident that those parameters did not merely come from the CALLED activity $A_bP_2$. Instead, they were the result of the sequential execution of three activities $A_bP_2$, $A_cP_3$, and $A_dP_4$.

But all of this sequential execution was completely hidden from activity $A_aP_1$ due to the operation of the INTERPROCESSOR NEXT instruction. Consequently, the linking of activity $A_aP_1$ to the other activities $A_cP_3$ and $A_dP_4$ was greatly simplified. Further, since activities $A_bP_2$ and $A_cP_3$ did not have to be re-executed as parameters where passed from activity $A_dP_4$ to activity $A_aP_1$, that parameter passing occurred very quickly.

Reference should now be made to FIG. 7 which illustrates another system in which the plurality of processors $P_1$, $P_2$, ... $P_n$ access and change multiple processor records, activity records, and parameters in a shared memory SM. This system differs primarily from the above-described FIG. 1 system in that it includes a file access controller 20 which authorizes the processors to access and change the records directly by conventional memory read and memory write commands.

That is, the records in the FIG. 7 system are stored in a conventional memory; they are accessed through a conventional nonintelligent memory controller MC; and the processors of the FIG. 7 system execute the INTERPROCESSOR instructions by sending sequences of one-word memory read and memory write commands directly to a nonintelligent memory controller MC. But before any processor sends such commands to the nonintelligent memory controller to read or write the records in the shared memory SM, it must receive authorization to do so from the file access controller 20.

Figure 8A:
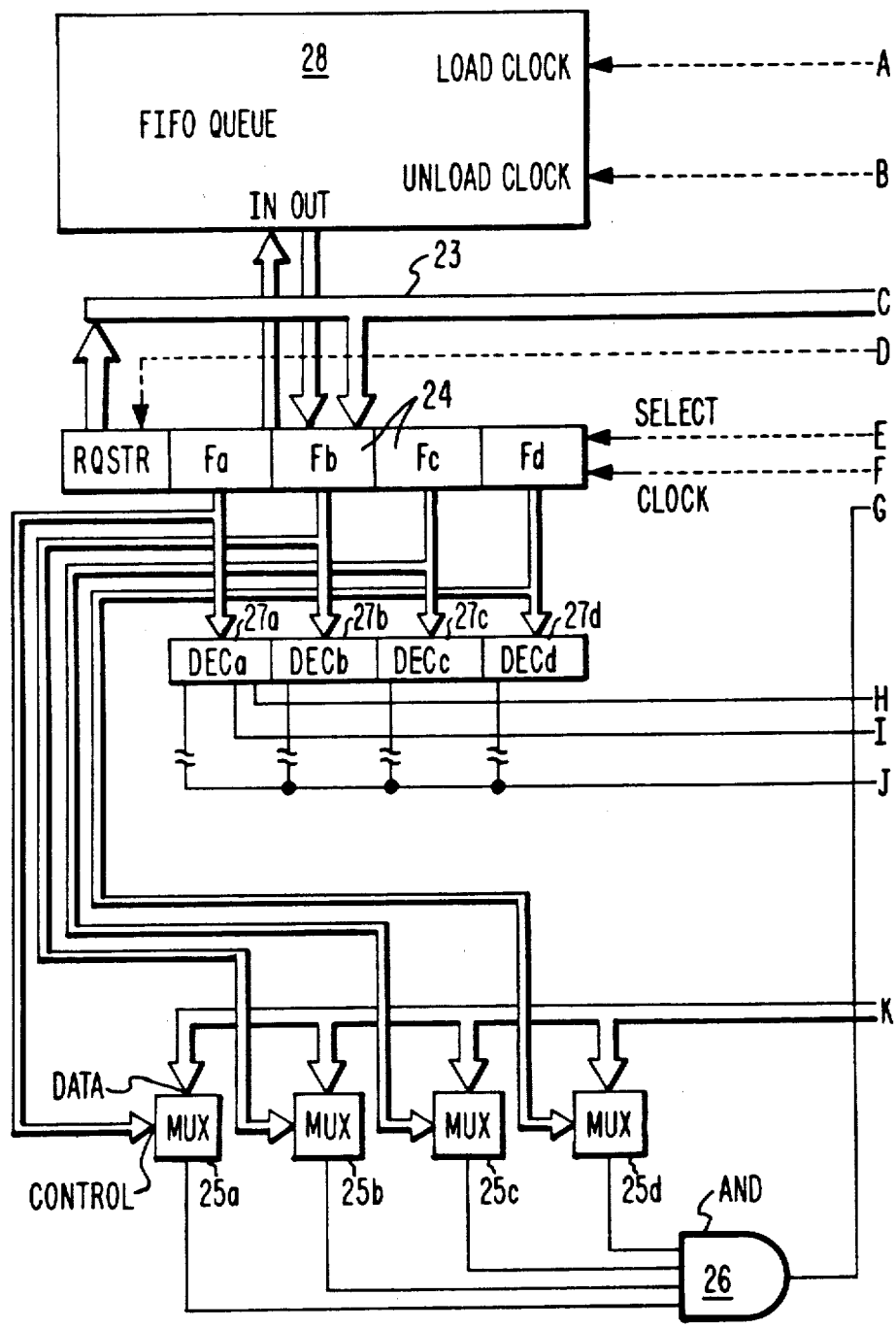
FIGS. 8A and 8B illustrate the detailed logic of a file access controller in the FIG. 7 system.
Figure 8B:
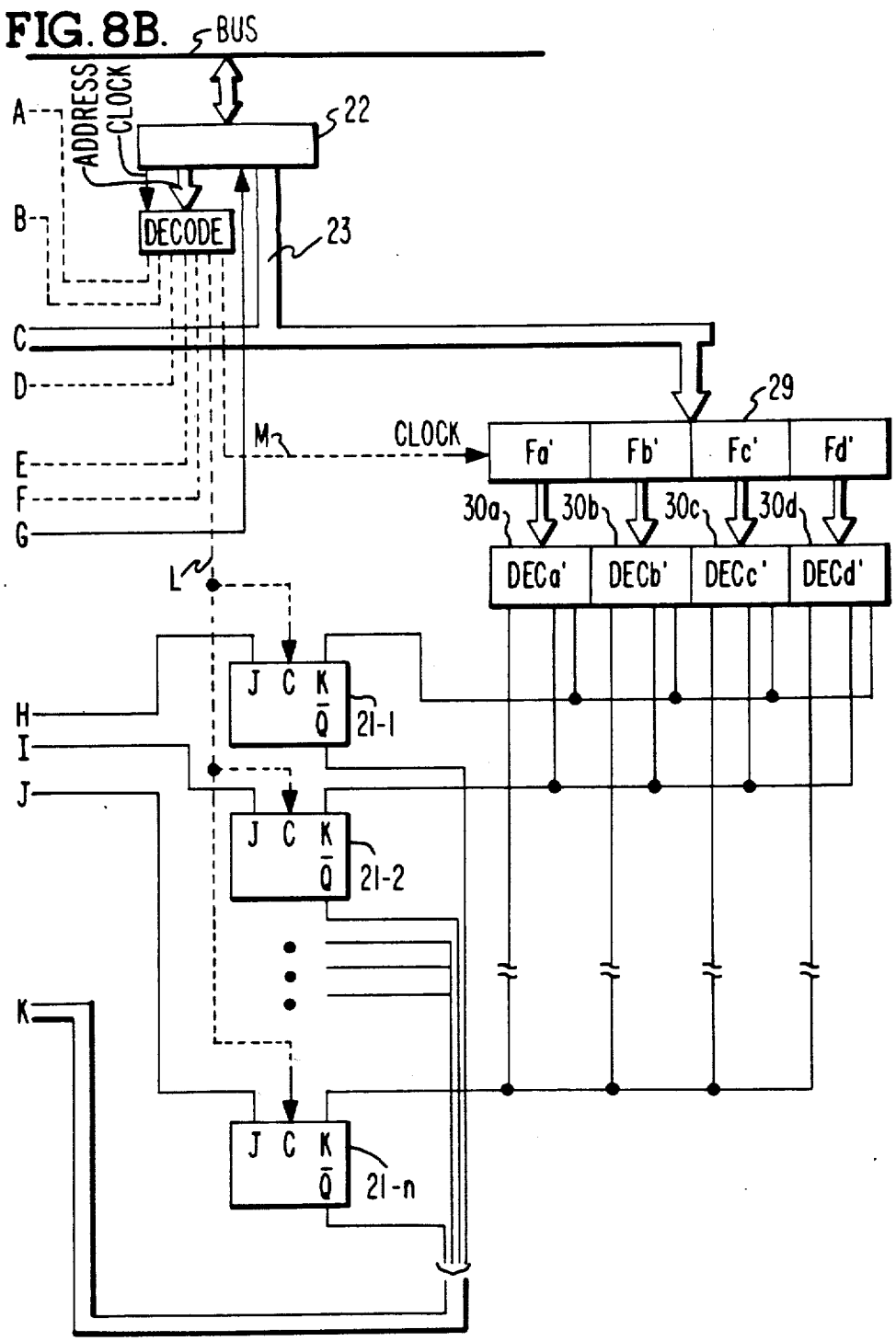

FIG. 8 illustrates the details of one preferred embodiment of the file access controller 20. It includes a plurality of "n" flip-flops 21-1 through 21-n. In one embodiment, each flip-flop corresponds to one record in the shared memory SM. That is, each flip-flop corresponds to one processor record or one activity record. Alternatively, as a design choice, each flip-flop corresponds to one processor record and all of the corresponding activity records for that one processor record.

Initially, all of the flip-flops are reset. Then, before a processor is permitted to access any record, it must first interrogate the flip-flops to determine whether those which correspond to the records that it wants to access are presently reset. To that end, the requesting processor sends a message over the bus to a module 22 within the controller. Suitably, module 22 is a microprocessor.

That message which is sent to module 22 identifies the requesting processor; and it also identifies all of the records of which access is sought. For example, four processor records $PR_a$, $PR_b$, $PR_c$, and $PR_d$ and all of the corresponding activity records may be identified by four encoded fields $F_a$, $F_b$, $F_c$, and $F_d$ in the message.

Upon receiving the message, module 22 passes it over an internal bus 23 to a register 24. From there, fields $F_a$, $F_b$, $F_c$, and $F_d$ are sent to the control input terminals of multiplexers 25a, 25b, 25c, and 25d respectively. Each multiplexer also has its data input terminals coupled to the $\overline{Q}$ outputs of all of the flip-flops 21-1 through 21-n.

Thus, field $F_a$ of register 24 causes the $\overline{Q}$ output of the one flip-flops which corresponds to field $F_a$ to be gated to the output of multiplexer 25a. Similarly, field $F_b$ of register 24 causes the $\overline{Q}$ output of the one flip-flop which corresponds to that field to be gated to the output of multiplexer 25b; etc. All of those $\overline{Q}$ outputs are then ANDed together by an AND gate 26; and the result is sent back to module 22 where it is sensed.

If the signal from AND gate 26 is a logic ONE, then module 22 sends a message over the bus authorizing the requesting processor to change the contents of the identified records. Internal bus 23 provides a means for sensing the requesting processor's identification so this message can be sent to it.

Also, if the signal from AND gate 26 is a ONE, module 22 sends a single clock pulse to all of the flip-flops 21-1 through 21-n. Those flip-flops are JK flip-flops; and which of them have an active signal on their J input is controlled by the $F_a$, $F_b$, $F_c$, and $F_d$ fields in register 24. Thus, those flip-flops that correspond to the fields $F_a$, $F_b$, $F_c$, and $F_d$ are all set in response to the single clock pulse.

More specifically, the $F_a$, $F_b$, $F_c$, and $F_d$ fields in register 24 are sent to decoders 27a, 27b, 27c, and 27d respectively. Each of those decoders generates multiple output signals; but only one of those signals goes high at a time. That output signal which goes high corresponds to the code which the decoder receives from register 24.

In other words, the first output of decoder 27a goes high when field $F_a$ in register 14 equals a binary one; the second output of decoder 27a goes high when field $F_a$ in register 24 is a binary two; etc.

Also, the first output of decoders 27a, 27b, 27c, and 27d are all connected together in a WIRED-OR fashion. Thus, if any of the fields $F_a$, $F_b$, $F_c$, or $F_d$ in register 24 equal a binary one, it will cause flip-flop 21-1 to be set. Similarly, the second output of decoders 27a, 27b, 27c, and 27d are connected together in a WIRED-OR fashion; etc.

Suppose now that module 22 receives a request from a processor to access various records as specified by fields $F_1$ through $F_4$; but the output of gate 26 is a ZERO which indicates that at least one of the corresponding flip-flops is set. In that case, module 22 loads the contents of register 24 into a first-in-first-out (FIFO) queue 28; and it adds one to a counter which is internal to module 22.

Next, suppose that one of the processors which previously was granted authorization to interrogate some records has completed its task. In that case, the processor must send module 22 a message indicating which records it has finished interrogating. Preferably, those records are identified in the message by multiple encoded fields.

That message is then sent by module 22 to a register 29. From there, the fields which contain the numbers of the records that were interrogated are sent to respective decoders. For example, four decoders 30a, 30b, 30c, and 30d are provided if the message in register 29 contains four encoded fields $F_a'$, $F_b'$, $F_c'$, and $F_d'$.

Decoders 30a through 30d all have their first outputs connected together in a WIRED-OR fashion; and they also connect to the K input of flip-flop 21-1. Thus, if any of the four fields in register 29 contains a binary one, flip-flop 21-1 will be reset when all of the flip-flops are clocked.

Similarly, the second output of decoders 30a–30d are all connected together; and they are connected to the K input of flip flop 20-2; etc. Thus, to reset the flip-flops which correspond to the records that were interrogated, module 22 merely clocks all of the flip-flops with a single pulse after it loads register 29.

Then module 22 examines its internal counter to determine how many entries are in the FIFO 28. If the count is not zero, module 22 moves the queue entries one at a time into register 24. After each such move, it examines the output of AND gate 26 to determine if it is in a ONE state.

If AND gate 26 is in a ONE state, then module 22 reads the requester portion of register 24 onto bus 23 and sends that requester a message indicating that it may now modify the records it requested. Also, all of the flip-flops 21-1 through 21-n are clocked by module 22 with a single pulse which sets them as directed by the outputs of decoders 27a through 27d. Further, the counter that is internal to module 22 is decremented by one.

Conversely, if the output of AND gate 26 is in a ZERO state, then module 22 merely reloads the contents of register 24 back into FIFO 28.

In FIG. 8, a set of six dashed lines represent respective conductors on which respective control signals are sent by module 22 to cause the above-described operations to occur. Specifically, a clock pulse is sent on conductor A to load a word into FIFO 28; and a clock pulse is sent on conductor B to unload a word from FIFO 28.

Also, a control signal is sent on conductor E to select the input data to register 24 to be from FIFO 28 or bus 23; and a clock pulse is sent on conductor F to load the selected input data into register 24. Further, a clock pulse is sent on conductor L to clock the flip-flops 21-1 through 21-n; and a clock pulse is sent on conductor M to load register 29.

One feature of the above-described file access controller 20 is that it enables several of the processors $P_1$, $P_2$, ... $P_n$ to access and change various records in the shared memory at the same time. The only restriction on this is that no two processors can change the same record. Thus, for example, processor $P_1$ could be changing records 1, 15, 30 and 56, while processor $P_2$ is changing records 2, 12, 31 and 40, while processor $P_3$ is changing records 3, 11, 20 and 31.

Another feature of the FIG. 7 system is its flexibility. Once a processor obtains authorization from the file access controller 20 to interrogate and change particular records, it can do so by any sequence of memory read and memory write commands. Therefore, records may be first read; and then the processor may CALL one activity or another based on contents of the records that it read. This implements a CONDITIONAL INTERPROCESSOR CALL instruction.

As one example of the usefulness of a CONDITIONAL INTERPROCESSOR CALL instruction, suppose that two processors perform the same activities. Both processors, for example, may perform high-speed floating point mathematical activities. In that case, by performing a CONDITIONAL INTERPROCESSOR CALL instruction, the caller can first examine the activity records of the two processors that perform the floating point activities; and then it can CALL an activity in one processor or the other depending upon which processor was not presently busy.

Another feature of the FIG. 7 system is the speed at which a processor can acquire access to the records in the shared memory SM. To send a control word to the file access controller 20 over the bus takes one cycle; to pass that message to register 24 takes a second cycle; to wait for the test condition from AND gate 26 to stabilize takes a third cycle; and to send a message back to the requesting processor authorizing it to access the requested records based on AND gate 26 plus send a clock pulse to set the corresponding flip flops 21-1 through 21-n takes a fourth cycle. Thus, with a cycle time of 100 nanoseconds, for example, access to the records is acquired in only 400 nanoseconds.

Various embodiments of the invention have now been described in detail. In addition, however, many changes and modifications can be made to these details without departing from the nature and spirit of the invention. Accordingly, it is to be understood that the invention is not limited to said details but is defined by the appended claims.

What is claimed is:

1. A method of synchronizing the sequence by which a variety of unrelated activities are executed in a plurality of digital processors when said activities in each processor randomly call the activities in the other processors, including the steps of:

providing with each processor, an individual processor queue for holding respective pointers to each different kind of activity that the processor performs;

entering into the processor queue of a processor whose activity is called, the pointer of the called activity the first time that activity is called;

providing, with each processor, respective activity queues for each different kind of activity that the processor performs;

entering a pointer to the caller of an activity in the respective queue for the called activity each time the activity is called subsequent to its first call;

repeatedly executing, in each processor, a single activity as pointed to by one pointer in the processor's processor queue until the activity is executed once for each of its callers as pointed to by its activity queue, provided that if said single activity calls another activity then, executing said single activity only up to the point where the call occurs; and proceeding in the same fashion, in each processor, with the execution of all other activities as pointed to by the processor's processor queue.

2. A method according to claim 1 and further including the step of removing from said activity queue, the pointer to a calling activity when the activity which it called is executed for that particular calling activity.

3. A method according to claim 2 and further including the step of limiting access to all of said queues such that said pointers can be entered therein and removed therefrom by only one processor at a time.

4. A method according to claim 3 and further including the step of storing said individual processor queue for each processor and respective activity queues for each processor as records in a memory.

5. A method according to claim 3 and further including the step of coupling all of said queues to said processors and callers via a single time-shared bus.

6. A method according to claim 3 and further including the step of storing the various activities that said processors perform in a memory which is coupled to and addressable by said processor but not by said callers of said activities.

7. A data processing system, including:

a plurality of digital processors;

each processor being coupled to a memory containing a variety of callable activities that the processor performs;

each processor having its own processor queue;

respective pointers in each processor queue pointing to each different kind of activity that has been called for that processor to perform;

each processor further having respective activity queues for each kind of activity that the processor performs;

each activity queue containing pointers to the callers of that particular activity;

means for directing each processor to repeatedly execute a single activity as pointed to by one pointer in that processor's processor queue until said single activity is executed once for each caller in the corresponding activity queue, provided that if said single activity calls another activity then to execute said single activity only up to the point where the call occurs; and means for directing each processor to proceed in the same fashion with the execution of all other activities as pointed to by that processor's processor queue.

8. A system according to claim 7 wherein said means for directing includes a controller means that is responsive to an instruction from any processor that calls an activity or completes the execution of a called activity to interrogate said pointers in said queues and to inform the processor which sends said instruction of the activity to perform next.

9. A system according to claim 7 wherein the processor queue for each processor and respective activity queues for each processor are comprised of records in a memory.

10. A system according to claim 7 and further including means for limiting access to said queues such that said pointers are entered by only one caller at a time.

11. A system according to claim 7 and further including a single time-shared bus coupling said queues to said processor and multiple callers.

* * * * *